June 15, 1926.
R. B. OWEN
1,588,802
INSULATOR FOR BATTERY PLATES
Filed Nov. 26, 1919  2 Sheets-Sheet 1
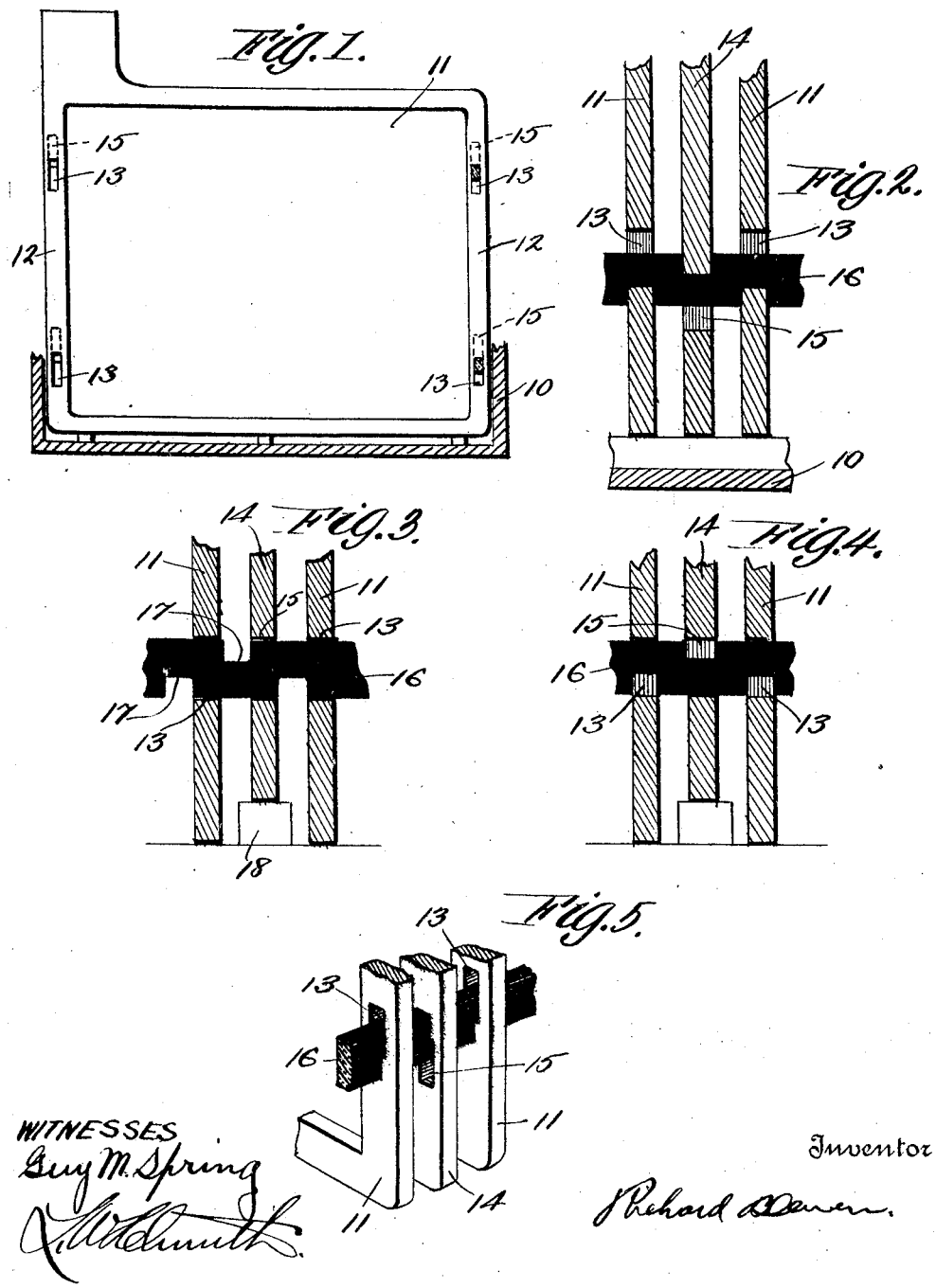

June 15, 1926.
R. B. OWEN
1,588,802
INSULATOR FOR BATTERY PLATES
Filed Nov. 26, 1919        2 Sheets-Sheet 2
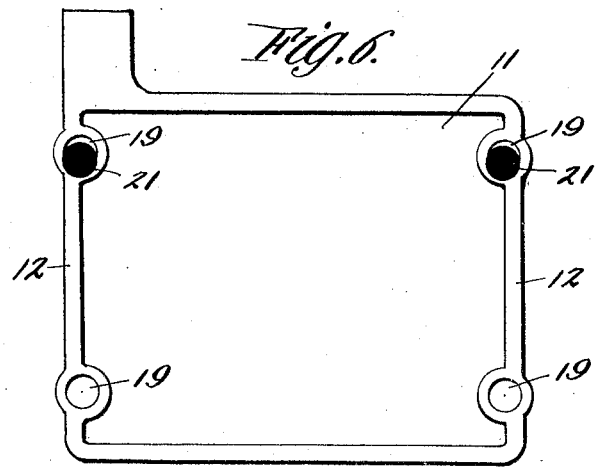
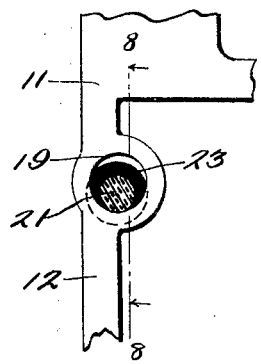
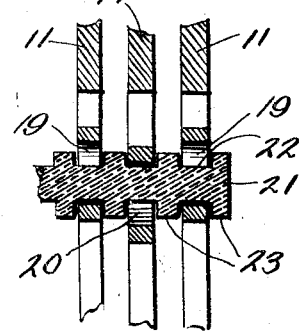
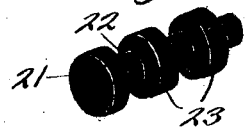
WITNESSES
Inventor Patented June 15, 1926.

1,588,802

UNITED STATES PATENT OFFICE.

RICHARD B. OWEN, OF WASHINGTON, DISTRICT OF COLUMBIA.

INSULATOR FOR BATTERY PLATES.

Application filed November 26, 1919. Serial No. 340,853.

This invention relates to new and useful insulators or spacing elements for accumulator electrodes or plates of secondary batteries, the primary object of the invention being to provide devices which will effectively lock the battery plates in spaced relation to one another, separate the plates electrically, and will reinforce the battery plates and thereby prevent buckling or warping thereof to a certain extent.

Another object of the invention is to provide devices of the above nature which are locked in their proper positions solely by the openings in the battery plates through which they extend.

A further object of the invention is to provide insulators or spacing bars which are easily and quickly assembled with battery plates, said spacing bars and plates being so constructed as to permit of the plates containing the maximum amount of active material, at the same time permitting the bars to accomplish the necessary functions.

The invention also consists in the construction, combination and arrangement of parts more fully set forth in the accompanying description and drawings and pointed out in the appended claims.

In the accompanying drawings, forming a part of the description and wherein like numerals are employed to designate like parts throughout the several views, Figure 1 is a side elevation of a battery plate with my invention applied thereto, Figure 2 is an enlarged fragmentary section of battery plates with the bar in locked position, Figure 3 is a similar view with the bar inserted through openings in the plates, Figure 4 is a similar view with the bar in position prior to the locking thereof, Figure 5 is a fragmentary perspective view of the invention applied to battery plates, Figure 6 is a side elevation of a battery plate having a modified form of the invention applied thereto, Figure 7 is an enlarged fragmentary view of one of the plates, the bar being sectioned, Figure 8 is an enlarged fragmentary vertical section through battery plates with the bar locked in position, taken on the line 8—8 of Fig. 7, Figure 9 is a perspective view of the modified form of locking bar.

In the accompanying drawings, wherein are shown preferred embodiments of the invention, the numeral 10 designates a portion of a battery container or vessel in which are positioned the plates 11. The opposite side margins 12 are each provided with a pair of openings 13 arranged adjacent the corners of the plate. The openings or slots 13 are arranged vertically with relation to the plates and the pair of openings in each margin are arranged in the same vertical plane as clearly shown in Fig. 1. Each alternate plate 14 has its side margins provided with a vertically arranged opening or slot 15 adjacent each corner thereof, and the pair of openings in each margin are likewise arranged in the same vertical plane, so that when the plates are assembled, the openings in corresponding margins are arranged in a vertical plane passed therethrough. However, the openings 15 in the alternate plates 14 are disposed in a lower plane than are the openings 13 of the plates 11 and consequently the corresponding series of openings in the plates are arranged in staggered relation and are misalined.

The insulators or spacing bars 16, each have their opposite longitudinal edges equipped with a plurality of notches 17, the notches in the upper edge of the bar being arranged between the notches in the lower edge, or vice versa. In other words, the notches are arranged alternately on opposite edges of the bar. It is to be noted that the openings or slots in the plates are of such dimensions as to accommodate the bars, whereby the latter may be easily inserted through the openings when the plates are in a position to be assembled.

To assemble the bars 16 with battery plates comprising a group, alternate plates 14 having their openings arranged lower than the other plates may be elevated and retained in such position, by any suitable supporting means 18, and it is to be understood that any suitable means for accomplishing the same function may be employed. When the alternate plates 14 are held in their raised position, their openings 15 aline with the corresponding openings 13 in the other plates 11, as more clearly shown in Fig. 3. The insulator bars or spacing elements 16 are then inserted through their respective alined openings until the notches in the lower edges of the bars are arranged directly above the bottoms of the openings 13 in the other plates 11 as more clearly shown in Fig. 1. The plates 11 are then raised which permits the lower ends of the openings 13 to engage the tops of the notches in the lower edges of the bars. Upon further upward movement of the plates 11, the bars will be carried or raised therewith, until the bottoms of the notches in the upper edges of bars engage the tops of the openings 15 in alternate plates 14, which engagement will consequently cause the alternate plates to be raised together with the other plates. When the plates are associated with the bars in this manner, the lower edges of all of the plates are arranged in the same plane.

From this arrangement, it will be evident that the plates of either positive or negative set cannot move vertically with relation to one another. All of the battery plates are locked spaced apart and separated electrically by each plate engaging the vertical sides of its respective notches. Further, the bars cannot move longitudinally, vertically, or laterally in view of the fact that the notches in opposite edges of the bar engage adjacent portions of the battery plates to prevent longitudinal and vertical movement of the bar, while the sides of the same will engage sides of their respective openings to prevent any lateral movement, and accordingly a positive locking device is provided.

In the modified form of invention shown in Figs. 6, 7, 8 and 9, circular openings 19 are provided in the plates 11 and 14 in the same manner as are the slots 13 in the preceding form, alternate plates 14 having their openings 20 arranged lower than the openings in the other plates 11, openings of each series to be arranged in staggered relation. The insulators or spacing elements 21 in this form of invention, are preferably round in cross section, whereby they will shed or cast off disintegrated particles of active material which will fall thereon, and are each equipped with a plurality of spaced annular grooves 22 in order to provide spaced annular ribs 23. Broadly speaking, the annular grooves 22 provide the insulator with notches upon opposite sides thereof. These insulators or spacing elements 21 are assembled with the plates in the manner set forth with respect to the preceding form of invention and engage the plates in the same manner. The annular ribs 23 will be disposed between adjacent plates to space the latter, and the insulators will be absolutely prevented from displacement.

In either form of invention, it is to be understood that the openings 15 in alternate plates 14 may be arranged in a plane above the openings 13 in the other plates 11 instead of in a lower plane whereby the staggered relation of openings of each series is provided, in which case the plates 11 would be raised when assembling a group of plates to align the openings of each series. Further, I do not desire to restrict myself to the exact manner of aligning openings of each series to accommodate the respective bars, as various other methods may be employed.

It is to be understood that the forms of invention disclosed in this application are to be considered preferred embodiments of the invention and that I may make such changes in the size, shape and construction of various parts as will fall within the spirit of the invention and the scope of the subjoined claims.

Having thus fully described my invention what I claim as new and desire to secure by Letters Patent, is:—

1. The combination with battery plates having openings of a bar having notches and extended through said openings and locked in engagement with said battery plates and against relative movement therewith solely by adjustment of certain of said battery plates.

2. The combination with battery plates having openings, of a bar having notches in opposite edges thereof and extended through said openings and locked in engagement with said plates and against displacement by adjustment of the latter.

3. The combination with battery plates having openings, of a bar having annular spaced grooves therein designed to be extended through said openings to admit adjacent portions of the battery plates in the grooves thereof.

4. The combination with battery plates having openings staggered in relation to each other, of a bar having spaced recesses therein and designed to be extended through said openings to admit adjacent portions of the battery plates in the recesses thereof.

5. The combination with battery plates having openings staggered in relation to each other, of a bar having notches in opposite sides thereof and extended through said openings to admit adjacent portions of said plates in the notches thereof.

6. The combination with battery plates having openings, alternate plates having their openings misalined with the openings in the adjacent plates, of a bar having notches in opposite sides thereof, and extended through said openings to admit adjacent portions of said plates in the notches thereof.

7. The combination with battery plates having openings, alternate plates having their openings staggered with relation to the openings in the adjacent plates, of a bar having notches in opposite sides thereof, and extended through said openings to admit adjacent portions of said battery plates in the notches thereof.

8. The combination with battery plates having openings, alternate plates having their openings disposed lower than the openings in adjacent plates and in the same vertical plane extending therethrough, of a bar having notches in opposite sides thereof and extended through said openings to admit adjacent portions of said battery plates in the notches thereof.

9. In combination with two series of battery plates each provided with aligned openings, the openings of one series of plates being only partially aligned with the openings of the other series of plates; and means common to both series of plates and engaged through said openings to lock the plates from relative movement.

10. The combination with battery plates having openings in staggered relation to each other, of a bar having notches in the top and bottom thereof, and extended through said openings whereby the notches in the top of the bar receive the upper edges of the openings in alternate plates and the notches in the bottom of the bar receive the lower edges of the openings in the other plates.

11. The method of assembling a spacing and insulating strip with battery plates having openings, consisting of alining said openings, inserting a spacing strip therethrough and misalining the openings to cause portions of the plates to interlock with the spacing strip.

12. The combination with battery plates having openings, a locking element extended through said openings and locked in engagement with the plates and against movement by adjustment of the plates.

13. The combination with battery plates having openings; of a locking element extended through said openings and locked in engagement with the plates and against movement relative thereto by adjustment of the plates to misalign certain of the openings.

14. The combination with battery plates having openings adapted for alignment, a locking element adapted to be extended through the openings while aligned, and certain of the plates being adjusted to misalign their openings to cause the locking element to be prevented from movement relative to the plates.

In testimony whereof, I affix my signature.

RICHARD B. OWEN.